May 9, 1933.                T. T. GRAY                1,908,599
                         REFINING PROCESS
                        Filed July 10, 1928
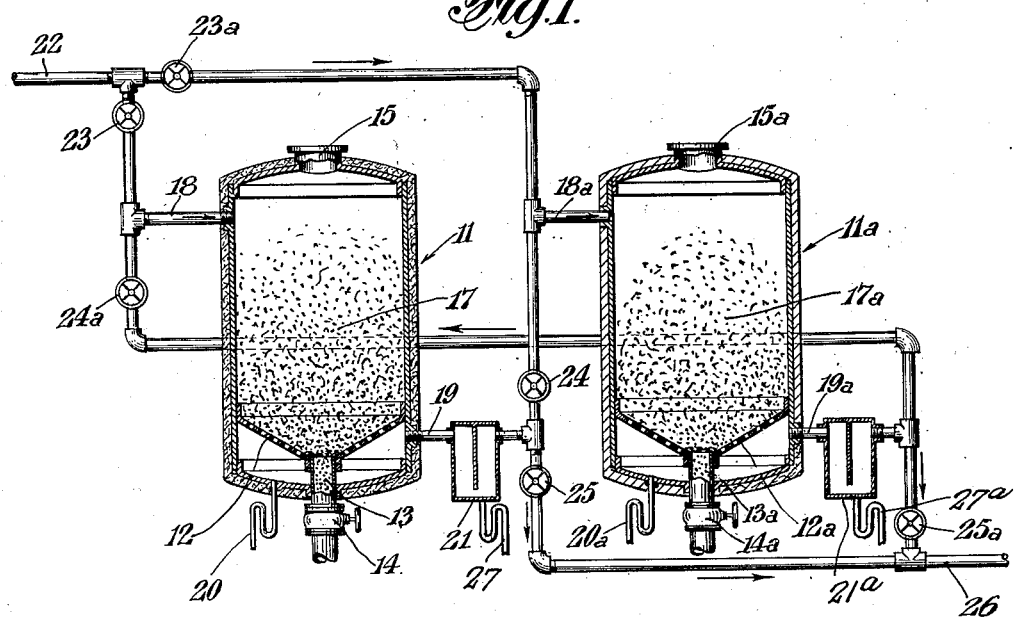
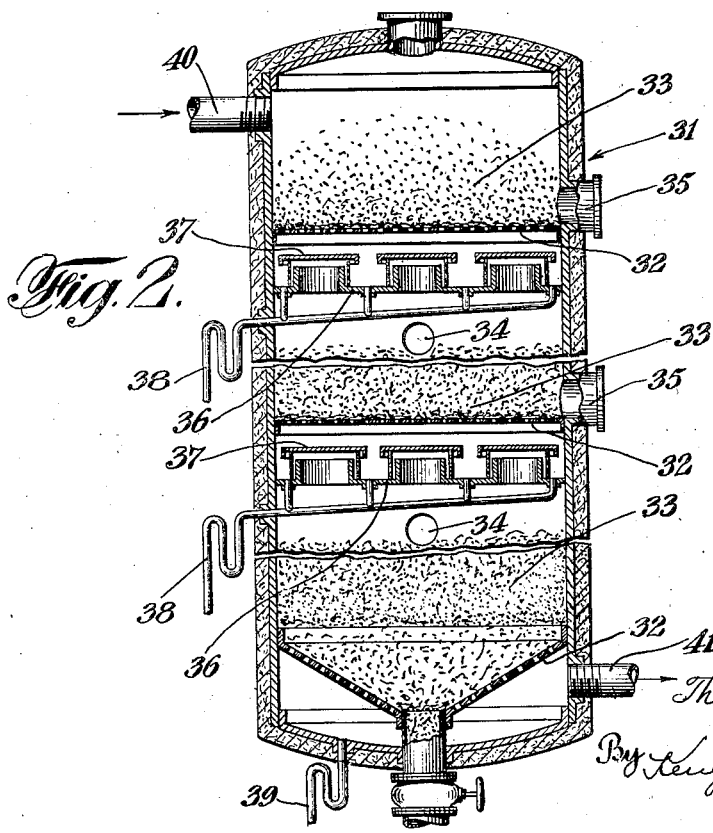
Inventor
Thomas T. Gray
By Kenyon & Kenyon
Attorneys Patented May 9, 1933

1,908,599

UNITED STATES PATENT OFFICE

THOMAS T. GRAY, OF ELIZABETH, NEW JERSEY, ASSIGNOR TO THE GRAY PROCESSES CORPORATION, OF NEWARK, NEW JERSEY, A CORPORATION OF DELAWARE

REFINING PROCESS

Application filed July 10, 1928. Serial No. 291,597.

This invention relates to petroleum refining and pertains especially to the purifying of cracked hydrocarbons by contracting the same in vapor phase with solid material capable of polymerizing the objectionable unstaple, unsaturated, constituents of the vapors.

When cracked hydrocarbon vapors are passed through such material, the most common example of which in commercial use is fuller's earth, the unstable, unsaturated constituents such as diolefins and the like present therein are polymerized into compounds of higher boiling points which compounds liquefy and are thereby separable from the vapor. This is taken advantage of in the refining process disclosed in my U. S. Patent Serial #1,340,889, and in various improvements of such process. In general these processes are practised by connecting a treating tower containing treating material capable of polymerizing the objectionable unstable, unsaturated, constituents of cracked hydrocarbons to a distillation system which may be a cracking, a re-running or a topping system, and the hydrocarbons to be treated are passed in vapor phase through the treating material until the latter is spent as evidenced by the lack in refinement of the treated vapor. Polymers formed in the process are separated from the treated vapors by virtue of their higher boiling point. It is preferable to pass the vapor downwardly through the catalyst, although upward treatment gives satisfactory results.

The present invention has for an object an improvement on the above process which results in a product of superior quality as regards freedom from gum forming constituents, color, stability and the like, and also in a higher ratio of hydrocarbons treated to catalyst used. It also provides for more efficient separation of polymers from the treated vapors and more convenient means of continuous operation than hitherto have been available.

A better understanding of the novel features of this invention will be facilitated by a description of the manner in which the catalyst becomes spent in the process as heretofore carried on, particularly where the vapors are passed downwardly through the treating material. It is apparent that in such process the least refined vapors come first in contact with the material near the top of the treating tower and successively lower layers are subjected to progressively more refined vapors. In this way the upper strata of the treating material should become spent before the lower ones. However, in actual operation it has been found that it is the lower layers and not the upper which first become so saturated with polymers as to prevent them having a beneficial effect on the vapors. Apparently this is caused by the wetting of the lower portions of the catalyst by polymers produced in the upper portion and carried down by the combined action of gravity and the vapor stream.

Moreover when the vapors are passed downwardly through the treating material they come in contact finally with the material most fully saturated with polymers and the difficulty of completely separating the treated vapor and polymers is increased and the quality of the treated vapor may actually be lessened by being passed through the bottom layers, due to entrainment of polymers in the vapor.

According to the present invention the above noted undesirable features are eliminated by utilizing a plurality of beds of treating material instead of using, as heretofore, a single bed. The polymers formed in each bed or treating zone are removed from the vapor stream before the latter passes on to the next treating bed or zone. Polymers formed in one zone are thus prevented from wetting the treating material in successive zones and the effective life of the latter is materially increased; each treating bed or zone is maintained uncontaminated by polymers from the preceding stages.

Other objects, novel features and advantages of this invention will be apparent from the following description and accompanying drawing wherein:

Fig. 1 discloses (partly in section) one type of apparatus suitable for carrying out the process and Fig. 2 discloses (partly in section) another type of apparatus.

Referring now more particularly to Fig. 1, 11 and 11a are insulated treating towers provided with perforated shelves 12 and 12a, suitable for supporting the solid adsorptive catalytic material to be used in treating the vapor. These shelves terminate in discharge spouts 13 and 13a controlled respectively by valves 14 and 14a. Manheads 15 and 15a are provided for charging the treating material 17 into the towers. The towers are provided with vapor inlets 18 and 18a and vapor outlets 19 and 19a; they are also provided with suitable trapped outlets 20 and 20a for removing polymers and other liquid products therefrom. Separators 21 and 21a are provided in the vapor outlets for ensuring complete separation of liquid from the treated vapors. These separators may be of the baffle type as shown or may be packed or bubble towers or other suitable separators. These separators need not both be alike, but one may be of one type and one another. Each shelf 12 is adapted to prevent the treating material, preferably fuller's earth, from passing through the perforations while permitting the passage of fluids.

A pipe 22 leads from the cracking or distillation system which is preferably provided with a fractionator, and is connected through pipes controlled by valves 23, 23a with the vapor inlets 18 and 18a respectively. The separator 21 is connected through a pipe controlled by the valve 24 with inlet 18a and the separator 21a is connected through a pipe controlled by the valve 24a with the vapor inlet 18. The separators 21 and 21a are also connected through pipes controlled by the valves 25 and 25a respectively with a pipe 26 leading to another treating tower, if desired, or to a condenser (not shown).

When both towers are freshly charged with treating material which may be fuller's earth, porous material impregnated with zinc chloride, or other chemical polymerizing agent and like materials or substances having similar polymerizing characteristics, the vapor to be treated supplied through the pipe 22 is caused to pass first through the tower 11 and then through the tower 11a. This is accomplished by opening the valves 23, 24 and 25a and closing valves 23a, 24a and 25. If desired the vapor may be caused to pass first through tower 11a and then through the tower 11 by reverse operation of the indicated valves. For the purpose of illustration assume that the connections are such that the vapor passes first through the tower 11 and then through the tower 11a. The treating material 17 is subjected to the least refined vapors and an energetic reaction ensues causing considerable polymerization of the unstable, unsaturated constituents. Polymers thus formed drain down through the treating material with the assistance of the vapors and are trapped out through the outlet 20. The treated vapor passes through the separator 21 where any entrained liquids or polymers are separated, after which the treated vapor passes through the inlet 18a in to the tower 11a. In this tower the treating material 17a is subjected to vapors which have already been partially refined and it acts as a further refining agent. Unstable, unsaturated constituents of the vapor undergo further polymerization and the polymers are removed in a manner similar to that described in connection with the first tower. From the second tower the treated vapor may be passed either through the pipe 26 to a condenser or may be passed through additional towers.

Operating in this way the catalyst in the first tower and which comes in contact with the untreated vapors will be the first to become spent. When this happens, as may be determined by inspection of samples taken of the product immediately after the first tower, the arrangement of the valves may be so changed that this tower is cut out of the operation while the spent catalyst is withdrawn and a fresh catalyst introduced. During this period the remaining tower or towers may be used alone or a spare tower may be cut in. When the first tower has been recharged with fresh catalyst the flow of vapor is changed so that it passes last through the tower containing the freshest catalyst. In this way the effective life of the treating material used is increased by protecting the incremental amounts thereof from the polymers produced in the preceding towers. By passing the vapors last through the freshest catalyst the separation of polymers from the purified vapors is most rapidly effected and the amount of gum-forming constituents and those tending to darken the color of the product are lessened.

Referring now to Fig. 2, 31 is an insulated treating tower provided with a plurality of perforated shelves 32, the bottom one of which terminates in a discharge spout control by a suitable valve. Upon each of these shelves there is supported a bed of treating material 33, preferably fuller's earth. Manholes 34 are provided for charging treating material onto the shelves 32 and manholes 35 are provided for removing the spent treating material from the upper shelves, the treating material being withdrawn from the lower shelf through its discharge spout. The tower is provided with a plurality of horizontal partitions 36, there being such a partition arranged beneath each of the upper shelves 32; these partitions are provided with shielded apertures 37 through which treated vapor may pass. Trapped pipes 38 are provided for removing polymers and other liquids draining through the shelves 32 on to the partitions 36. A trapped outlet 39 is also provided for removing liquids from the lower portion of the tower. Vapor is admitted to the upper part of the tower through the inlet 40 and discharged from the bottom of the tower through the outlet 41. The shelves 32 are permeable to fluid and impermeable to solids.

The operation of this apparatus is as follows:—Vapor to be treated is admitted through inlet 40 and passed downwardly through successive beds of treating material by way of the apertures 37 in the shelves 36 thereby effecting polymerization of the unstable, unsaturated constituents of the vapor. By means of the partitions 36, the polymers formed and condensate produced in each layer of treating material are prevented from passing on to the subsequent layers thereby preventing contamination of the latter, while the vapor passes freely through the openings 37. The pipes 38 keep the partitions free of liquid so that there is no tendency for the vapors to carry over entrained liquid. Treated vapors are removed through the outlet 41 and may be passed through a separator (not shown) completely to remove any liquid and polymers and are then carried over to the condenser.

With each type of apparatus the polymers formed in one treating stage are prevented from contaminating the treating material in a subsequent stage. The life of the treating material is increased and a better product is obtained. The number of treating stages used may be varied as desired to meet different conditions.

Preferably fuller's earth may be used as the treating material but other treating catalytic material capable of polymerizing unstable, unsaturated, hydrocarbon compounds may be used, porous material impregnated with zinc chloride or other chemical polymerizing agent and like materials or substances having similar polymerizing characteristics.

I claim:—

1. In the process of refining cracked hydrocarbons in the vapor phase by the polymerization of unstable, unsaturated hydrocarbons by the action of a charge of solid adsorptive polymerizing material characterized by the passage of the vapors and polymers through the solid polymerizing material in the same direction, the improvement comprising dividing the charge of polymerizing material into a plurality of separate beds through which the vapor is passed serially, separating vapors and polymers issuing from a bed and passing said issuing vapors substantially freed from polymers into a subsequent bed, thereby subjecting the partially refined hydrocarbon vapor to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed.

2. In the process of refining cracked hydrocarbons in the vapor phase by the polymerization of unstable, unsaturated hydrocarbons by the action of a charge of solid adsorptive polymerizing material characterized by the passage of the vapors and polymers downwardly through the solid polymerizing material, the improvement comprising dividing the charge of treating material into a plurality of separate beds through which the vapor is passed serially, separating vapors and polymers issuing from any bed and passing said issuing vapors substantially freed from polymers into a subsequent bed, thereby subjecting the partially refined hydrocarbon vapor to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed.

3. In the process of refining cracked hydrocarbons in the vapor phase by the polymerization of unstable, unsaturated hydrocarbons by the action of a charge of solid adsorptive polymerizing material characterized by the passage of the vapors and polymers through the solid polymerizing material in the same direction, the improvement comprising dividing the charge of treating material into a plurality of separate beds through which the vapor is passed serially passing vapors issuing from any bed through a separating zone in which the vapors are substantially freed from polymers, passing the polymer-freed vapors into a subsequent bed, thereby subjecting the partially refined hydrocarbon vapor to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed.

4. In the process of refining cracked hydrocarbons in the vapor phase by the polymerization of unstable, unsaturated hydrocarbons by the action of a charge of solid adsorptive treating material characterized by the passage of the vapors and polymers downwardly through the solid treating material, the improvement comprising dividing the charge of polymerizing material into a plurality of separate beds through which the vapor is passed serially, passing vapors issuing from any bed through a separating zone in which the vapors are substantially freed from polymers, passing the polymer-free vapors into a subsequent bed, thereby subjecting the partially refined hydrocarbon vapors to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed.

5. The process of refining cracked hydrocarbons in the vapor phase by the polymerization of unstable, unsaturated hydrocarbons by the action of a charge of solid adsorptive polymerizing material characterized by the passage of the vapors and polymers through the solid polymerizing material in the same direction, the improvement comprising dividing the charge of polymerizing material into a plurality of separate beds through which the vapor is passed serially, separating vapors and polymers issuing from any bed and passing said issuing vapors substantially freed from polymers into a subsequent bed, thereby subjecting the partially refined hydrocarbon vapor to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed, and passing the vapors issuing from the last treating bed through a separating zone in which they are substantially freed from polymers.

6. The process of refining cracked hydrocarbons in the vapor phase by the polymerization of unstable, unsaturated hydrocarbons by the action of a charge of solid adsorptive polymerizing material characterized by the passage of the vapors and polymers downwardly through the solid polymerizing material, the improvement comprising dividing the charge of polymerizing material into a plurality of separate beds through which the vapor is passed serially, separating vapors and polymers issuing from any bed and passing said issuing vapors substantially freed from polymers into a subsequent bed, thereby subjecting the partially refined hydrocarbon vapor to further refining action in which the polymerizing agent is uncontaminated by polymers formed in an earlier refining stage, thus increasing the activity of the subsequent bed and thereby producing a more highly refined product than would be obtained from a like charge of polymerizing material in a single bed, and passing the vapors issuing from the last polymerizing bed through a separating zone in which they are substantially freed from polymers.

7. In vapor phase refining of hydrocarbons with adsorptive catalysts, the improvement which comprises passing the vapors through an alternating series of bodies of the adsorptive catalyst at relatively high velocity and free vapor spaces at relatively low velocity, separating polymers produced by the vapor-catalyst contact from the vapor stream in the free vapor spaces between successive bodies of the adsorptive catalyst and discharging such separated polymers without permitting the discharged material again to come in contact with the bodies of the adsorptive catalyst in the series.

8. In vapor phase refining of hydrocarbons with adsorptive catalysts, the improvement which comprises passing the vapors downwardly through a series of bodies of the adsorptive catalyst and alternate free vapor spaces, separating polymers produced by the vapor-catalyst contact from the vapor stream in the free vapor spaces between successive bodies of the adsorptive catalyst and discharging such separated polymers without permitting the discharged material again to come in contact with the bodies of the adsorptive catalyst in the series.

In testimony whereof, I have signed my name to this specification.

THOMAS T. GRAY.

CERTIFICATE OF CORRECTION.

Patent No. 1,908,599.  May 9, 1933.

THOMAS T. GRAY.

It is hereby certified that error appears in the printed specification of the above numbered patent requiring correction as follows: Page 1, line 3, for "contracting" read "contacting"; page 3, strike out the paragraph contained in lines 38 to 45 inclusive, and insert instead—

Preferably fuller's earth may be used as the treating material but other solid treating material capable of polymerizing unstable, unsaturated hydrocarbon compounds may be used.

And that the said Letters Patent should be read with these corrections therein that the same may conform to the record of the case in the Patent Office.
Signed and sealed this 15th day of August, A. D. 1933.

M. J. Moore.

(Seal)   Acting Commissioner of Patents.